United States Patent Office
3,249,564
Patented May 3, 1966

3,249,564
COATING COMPOSITIONS COMPRISING ACRYLAMIDE COPOLYMERS AND COPOLYMERS CONTAINING 50% STYRENE
Edward C. Haskell, Cincinnati, Ohio, Francis W. Michelotti, Brooklyn, N.Y., Harry Burrell, Cincinnati, Ohio, and Eliakum Gustave Shur, Union, N.J., assignors to Interchemical Corporation, New York, N.Y., a corporation of Ohio
No Drawing. Filed July 20, 1962, Ser. No. 211,431
14 Claims. (Cl. 260—22)

This invention relates to novel thermosetting coating compositions based upon blends of alkylolated acrylamide copolymers and carboxyl-containing copolymers.

The novel blends of this invention when dissolved in volatile organic solvents provide compositions which upon curing yield very durable surface coatings that are relatively inexpensive, exhibit excellent resistance to scratching, detergents, staining and washing, are flexible and display good adhesion to surfaces, especially metal surfaces. They provide excellent coatings for household appliances such as refrigerators and washing machines. In addition, these novel blends may be used for coatings, both inside and outside, on tin cans. Tinplate coated with these coatings is readily fabricated into tin cans without any disruption or other effect on the coatings. The coatings also easily withstand the effects of pasteurization to which canned beverages such as beer are subjected.

The novel coating compositions are blends of a copolymer containing an alkylolated acrylamide and at least one other ethylenically unsaturated monomeric material with a copolymer of an ethylenically unsaturated carboxylic acid and at least one other ethylenically unsaturated monomeric material.

The prior art discloses methylolated acrylamide copolymers in which carboxylic acid monomers are incorporated as "internal catalysts." It has been found that the blends of this invention differ from said copolymer compositions in several advantageous respects. Firstly, the rate of curing in the blends of this invention is accelerated. Further, coatings made from the blends of this invention display greater flexibility than do coatings made from the copolymers. In addition, the copolymers, such as those of U.S. Patent 2,978,437, must be prepared under carefully regulated conditions requiring relatively low temperatures and long cooking times in order to prevent the acid component from catalyzing premature cross-linking and to prevent gelation. In the blends of this invention, as the acid component is not present during the initial polymerization, there is no danger of gelation, and hence conditions need not be as closely regulated. Shorter cooking times and higher cooking temperatures may be used.

The most significant feature of the blends of this invention, is that the effects of the various monomeric components in the blends are in direct relation to the proportion of the total of said monomeric components in the total blend irrespective of the proportions of said monomers with respect to the individual copolymers in which said monomers may be incorporated. For example, when blending a copolymer having a composition of 15% methylolated acrylamide, 40% styrene and 45% ethyl acrylate with a copolymer of 80% styrene, 12% methacrylic acid and 8% methacrylate, by varying the proportions of the two copolymers, we can achieve the effects of a styrene content in the range of from >40% to <80%. This of course would not be possible when using compositions of one copolymer as in the patent; a new copolymer would have to be prepared for each proportion.

In addition, pigmented as well as unpigmented coating compositions containing the novel blends of this invention have high stability, even on prolonged storage. All of the aforementioned desirable properties of these coating compositions are retained after such storage.

In the specification and claims which follow all proportions are by weight unless otherwise specified.

The alkylolated acrylamide containing copolymers used in this invention may be prepared by any of the conventional methods well known to those skilled in the art. Acrylamide monomers may be copolymerized with a wide variety of ethylenically unsaturated monomers including acrylic esters particularly methyl methacrylate, ethyl acrylate, butyl acrylate, hexyl acrylate, 2-ethyl hexyl acrylate and octyl acrylate; nitriles of acrylic and methacrylic acids; vinyl halides; styrene and vinyl toluene, maleic acid and esters thereof; vinyl ethers; vinyl acetones, particularly methyl vinyl ketone; dibutyl maleate; vinyl pyridines; 2-chloro-butadiene-1,3, etc. It will be obvious to those skilled in the art that mixtures of the above monomers may be copolymerized with acrylamide monomers to give copolymers of widely varying properties. In other words by the proper selection of monomers and proportions, acrylamide containing copolymers may be made to have specific hardness and flexibility characteristics. In the practice of this invention, it is preferred to use acrylamide copolymers containing substantial amounts of styrene and acrylic esters. The alkylolated acrylamide content is preferably from 2 to 18% based upon the copolymer weight.

In one method of producing the alkylolated acrylamide copolymers, the acrylamide monomer is first alkylolated by reaction with an aldehyde and then copolymerized with the other ethylenically unsaturated monomers. Alternately, these copolymers may also be prepared by the addition polymerization of the unsaturated monomers with acrylamide and the subsequent reaction of the resulting copolymer with the aldehyde in the conventional manner to alkylolate the acrylamide component or preferably by reacting the aldehyde with the acrylamide component during the polymerization of the mixture.

The entire reactions is preferably conducted in solution. The selected solvent must be one in which the acrylamide, the ethylenically unsaturated monomers and the aldehyde must be soluble. Aliphatic alcohols as methanol, ethanol and butanol are preferable as solvents with butanol being the most preferable of these. It should be noted that the solvents are preferably cut or mixed with aromatic hydrocarbon solvents such as xylene. The copolymerization of the monomers to form the acrylamide copolymer is initiated by "catalysts" or polymerization initiators of the free radical type. The most commonly used initiators are azo compounds and organic peroxygen compounds. Typical of the azo compounds that may be used for this purpose are azobisisobutyronitrile, and azo bisisovaleronitrile. Typical of the organic peroxygen compounds that may advantageously be used as copolymerization initiators are such compounds as cumene hydroperoxide, tertiary butyl perbenzoate, peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct, and cyclohexanone-hydrogen peroxide adduct. Since lower alkanol solvents are used, etherification may take place in which at least some of the methylol groups would be converted to alkoxymethyl e.g., butoxymethyl groups. Therefore, the term methylolated as used in the claims is meant to include alkoxymethylated acrylamides.

While methylolated acrylamide made by reacting acrylamide groups with formaldehyde is primarily mentioned in this application, it is to be understood that other alkylolated acrylamides provide efficient alternatives. These are prepared by using other aldehydes such as furfural, butyraldehyde and acetaldehyde in place of formaldehyde.

The copolymers which are blended with the alkylolated acrylamide copolymers are copolymers containing ethylenically unsaturated carboxylic acid monomers such as monomers of acrylic acid, methacrylic acid, itaconic acid, maleic acid, fumaric acid or crotonic acid. These carboxylic monomers may be copolymerized with a wide variety of ethylenically unsaturated monomers. For best results, the unsaturated carboxylic acid component constitutes from 4 to 15% of the total copolymer weight. Preferably, the copolymers include styrene, most preferably in amounts exceeding 40% of the polymer weight and advantageously an acrylic ester, e.g., methyl methacrylate, ethyl acrylate, butyl acrylate, hexyl acrylate, 2-ethyl hexyl acrylate and octyl acrylate. Other desirable monomeric materials which may be incorporated into these copolymers include nitriles of acrylic and methacrylic acids; vinyl halides; vinyl toluene; esters of maleic acid; vinyl ethers; vinyl acetones, particularly methyl ethyl ketone; dibutyl maleate; vinyl pyridines and 2-chloro-butadiene-1,3. Furthermore, it has been found that particularly desirable coating properties are achieved, if in addition to the ethylenically unsaturated acid, the copolymer also contains a hydroxyl containing monomer such as a monoester of acrylic acids e.g., propylene glycol monoacrylate, hydroxyethylmethacrylate, glyceryl monoacrylate, and similar compounds. These monoesters of acrylic acids preferably constitute from 5 to 30% and most preferably from 10 to 20% of the total copolymer weight.

The hydroxyl containing material may also be a polyester resin having unreacted hydroxyl groups which are copolymerizable with the ethylenically unsaturated acid and the other monomers. Such suitable copolymers containing polyester resins and ethylenically unsaturated acids are described in copending application Serial Number 180,414, filed March 14, 1962, in the name of H. Burrell and H. Behr, entitled "Copolymers of Polyester Resins and Coating Compositions Containing the Same." The copolymers comprise the addition polymerization product of (A) a preformed polyester resin comprising the condensation product of a glycol ether, an alpha-beta unsaturated dicarboxylic acid and a saturated dicarboxylic acid, (B) styrene, and (C) an alpha-beta unsaturated monocarboxylic acid. The preformed polyester resins used in these copolymers are prepared by a conventional condensation polymerization. Suitable glycol ethers include diethylene glycol, triethylene glycol, and dipropylene glycol. Suitable saturated dicarboxylic acids include adipic acid, succinic acid, azelaic acid, sebacic acid, glutaric acid and pimetic acid. The term alpha-beta unsaturated dicarboxylic acids include anhydrides, such as maleic anhydride. Other suitable alpha-beta unsaturated acids include maleic acid and fumaric acid. The polyester resin may optionally also contain an unsaturated fatty acid having a chain length of from 9 to 18 carbon atoms to control the chain length of said polyester resin. Suitable acids include pelargonic, lauric, myristic, palmitic and stearic acids. The copolymers containing the ethylenically unsaturated carboxylic acid are prepared by conventional addition polymerization methods such as those described herein above for the production of the acrylamide-containing copolymers. Where the hydroxyl-containing monoesters of acrylic acids are to be incorporated, they are included in the monomer mixture and where the preformed polyester resin is to be incorporated, it is included in the monomer mixture. The ethylenically unsaturated acid component preferably constitutes from 4 to 15% of the copolymer weight. When included, the preformed polyester resin preferably constitutes from 10% to 40% of the copolymer weight and the hydroxyl-containing monoester preferably constitutes from 5 to 30% and most preferably from 10% to 20% of the copolymer weight.

The previously mentioned copending application of H. Burrell et al. also discloses copolymers of said preformed polyester resins, styrene and methylolated acrylamide. Such copolymers also may be used in the blends of this invention as the alkylolated acrylamide-containing copolymer. These copolymers are made in substantially the same manner as the polyester resin-ethylenically unsaturated acid-containing copolymers except that the acrylamide is copolymerized in place of the ethylenically unsaturated acid. The acrylamide monomeric material may be previously, subsequently or simultaneously methylolated with respect to the copolymerization step.

The blends of this invention are prepared by mixing the alkylolated acrylamide-containing copolymer and the ethylenically unsaturated carboxylic acid-containing copolymer in a volatile organic solvent such as benzene, xylene, ethyl benzene, toluene, aromatic petroleum naphthas, lower aliphatic alcohols, ketones and ethers. On a solids basis it is preferable to blend from 0.1 to 9 parts and most preferably from 0.1 to 1.0 part of the carboxylic acid-containing polymer for each part of the methylolated acrylamide-containing copolymer.

The following examples will illustrate the practice of this invention.

*Example 1*

| | Weight, g. |
|---|---|
| Triethylene glycol | 1800 |
| Adipic acid | 876 |
| Maleic anhydride | 294 |
| A mixture of stearic and palmitic acids having a free fatty acid content of 98.5% (calculated as oleic) a total fatty acid content of 102.5% (calculated as oleic) and a 0.5% polyunsaturated acid content | 840 |

A mixture of the above ingredients is esterified into a polyester resin in the conventional manner by heating the mixture under a $CO_2$ atmosphere and agitations to 450° F. and maintaining said temperature until the acid number drops below 10. After 5 hours, the acid number is 5.2. The resulting polyester resin has a viscosity of W–X. 14% of the original OH groups remain unesterified in said polyester.

*Example 2*

300 g. of a polymerizable mixture consisting of 30% of the polyester of Example 1, 62% styrene and 8% methacrylic acid are added to 750 g. of xylol, 250 g. of butanol and 7.5 g. of benzoyl peroxide and the mixture is heated to reflux. While the mixture is maintained at reflux, an additional 1200 g. of the polymerizable mixture are added over a period of 1 hour. The mixture is permitted to reflux for 1 hour after which 10 g. of benzoyl peroxide and 20 g. of butanol are added and the mixture is continued at reflux for 2½ hours. The resulting solution has a viscosity of $Z_5$ (Gardner-Holdt) and a 59% solids content.

Example 3

To a mixture of 600 parts of butanol, 1955 parts of Solvesso 150 [1] solvent, 120 parts acrylamide, 60 parts paraformaldehyde, 0.83 part sodium nitrate and 0.16 part of sodium hydroxide, there is added a monomeric mixture consisting of 89 parts of ethyl hexyl acrylate, 586 parts of styrene and 40 parts of cumene hydroperoxide. The mixture is heated to reflux and 176 parts of ethyl hexyl acrylate, 1176 parts of styrene and 80 parts of cumene hydroperoxide are added to the mixture over a period of one hour. The mixture is then maintained at reflux for an additional 5½ hours while adding about 24 parts of benzoyl peroxide at each one hour interval. The resulting resin solution has a solids content of 50%.

Example 4

To a mixture of 600 parts butanol, 1955 parts Solvesso 150 solvent, 120 parts acrylamide, 60 parts paraformaldehyde, 0.83 part of sodium nitrate and 0.16 part of sodium hydroxide, there is added a monomeric mixture of 147 parts of ethyl hexyl acrylate, 528 parts of styrene and 40 parts of cumene hydroperoxide. The mixture is heated to reflux and 293 parts of ethyl hexyl acrylate, 1057 parts of styrene and 80 parts of cumene hydroperoxide are added to the mixture over a period of 1 hour. The mixture is then maintained at reflux for an additional 5½ hours while adding about 24 parts of benzoyl peroxide at each 1 hour time interval. The resulting resin solution has a viscosity of O–P (Gardner-Holdt) and a solids content of 45%.

Example 5

Example 4 is repeated using the same ingredients except methyl methacrylate is used in place of ethyl acrylate. The resulting resin solution has a viscosity of $Z_4$ to $Z_5$ and a solids content of 55%.

Example 6

A mixture of 54 g. of the polyester resin of Example 1, 246 g. of styrene, 20 g. cumene hydroperoxide, 96 g. acrylamide, 48 g. paraformaldehyde, 0.3 g. $NaNO_2$, 0.06 g. NaOH, 300 g. butanol and 980 g. xylene is heated to reflux at 235° F. Then a mixture of 108 g. of the polyester resin of Example 1, 494 g. of styrene and 40 g. of cumene hydroperoxide is added to the refluxing mixture over a period of one hour. The resulting mixture is permitted to reflux for another hour, at which point, 10 g. of benzoyl peroxide are added and the mixture maintained at reflux for an additional hour. 10 g. more of benzoyl peroxide are added and the mixture refluxed for 1½ hours. Another 10 g. of benzoyl peroxide are added and the mixture is permitted to reflux for 2½ hours, at which point 10 g. more of benzoyl peroxide are added. The mixture is then heated for 1½ additional hours. The mixture is cooled and filtered. The resulting copolymer solution has a viscosity of U+ (Gardner-Holdt) and a solids content of 45.8% by weight.

Example 7

600 g. styrene, 80 g. of ethyl acrylate, 120 g. acrylamide, 16 g. tertiary-butyl perbenzoate, and 8 g. tertiary dodecyl mercaptan were refluxed 1 hour at 121° C. in 400 g. xylene and 400 g. butanol. 8 g. more of tertiary-dodecyl mercaptan were then added, refluxing continued for 3 hours, 4 g. of tertiary-butyl perbenzoate were then added. The batch was cooled after 2 more hours of refluxing. 252 g. butyl Formcel was added and the mixture heated 3 hours at the azeotropic distillation point (about 104° C.). The solids content of the batch was 48.6%.

Example 8

187.5 g. styrene, 25 g. ethyl acrylate, 37.5 g. acrylamide, 5 g. tertiary-butyl perbenzoate, and 2.5 g. tertiary-dodecyl mercaptan were refluxed 1 hour at 120° C. 2.5 g. more of tertiary-dodecyl mercaptan were added and refluxing continued 3 hours, 1.25 g. of tertiary-butyl perbenzoate were added and the batch was refluxed 2 hours more. After cooling 79 g. of butyl Formcel [1] were added and azeotropic distillation carried out for 3 hours at about 106° C. Solids content was 49.3%.

Example 9

187.5 g. styrene, 30 g. ethyl acrylate, 7.5 g. methacrylic acid, 25 g. propylene glycol monoacrylate, 2.5 g. tertiary-butyl perbenzoate, and 2.5 g. tertiary-dodecyl mercaptan were refluxed 4 hours at 119° C. in 62 g. xylene and 188 g. toluene. 1.25 g. more of tertiary-butyl perbenzoate were added, refluxing continued another 2 hours, and the batch was cooled. Solids content was 48.9.

Example 10

150 g. styrene, 55 g. ethyl acrylate, 7.5 g. methacrylic acid, 37.5 hydroxethylmethacrylate, 2.5 g. tertiary-butyl perbenzoate and 2.5 g. tertiary-dodecyl mercaptan were refluxed at 119° C., for 4 hours in 62 g. xylene and 188 g. toluene. 1.25 g. more of tertiary-butyl perbenzoate were then added and refluxing continued 2 hours more. Solids content of the batch was 48.7%.

Example 11

150 g. styrene, 55 g. ethyl acrylate, 7.5 g. methacrylic acid, 37.5 g. hydroxy-propylmethacrylate, 2.5 g. tertiary-butyl perbenzoate, and 2.5 g. tertiary-dodecyl mercaptan were refluxed 4 hours at 119° C. in 62 g. xylene and 188 g. toluene. 1.25 g. tertiary-butyl perbenzoate were added and refluxing continued 2 hours more. Solids content was 49.2%.

Example 12

The following ingredients are blended:

| | Parts by weight |
|---|---|
| The copolymer solution of Example 2 | 27.1 |
| The copoylmer solution of Example 6 | 33.8 |
| Titanium dioxide | 19.0 |
| Xylene | 17.3 |

Black iron panels are coated with this blend and then baked for 15 minutes at 325° F. The resulting white films display no discoloration, excellent hardness flexibility, mar resistance and adhesion.

Example 13

The following are blended:

| | Parts by weight |
|---|---|
| The copolymer solution of Example 2 | 27.1 |
| The copolymer solution of Example 6 | 33.8 |
| Titanium dioxide | 19.0 |
| Xylene | 13.3 |
| A 50% solution in xylene of the reaction product of Epon 1001 and methacrylic acid in the presence of a tertiary amine catalyst such as N,N-dimethylbenzyl amine, one equivalent or a slight excess of carboxyl being reacted for each equivalent of epoxide | 4.0 |

Black iron panels are coated and baked in accordance with the procedure of Example 12. The resulting films have properties equivalent to those of Example 12 except that flexibility is better.

Epon 1001 is described in the text Epoxy Resins, Irving Skeist, published 1958, as an epoxy resin made by the reaction of Bisphenol A (2,2-diphenol propane) and epichlorohydrin and having an average molecular weight of 875, an epoxide equivalent weight of 450–525, a hydroxyl equivalent weight of 145 and from 1.7 to 1.9 epoxide groups per molecule.

---

[1] An aromatic hydrocarbon solvent having a boiling range of 369° to 412° F. and a K.B. value of 92.1.

[1] Formaldehyde 40%, n-butanol 51.5%, water 8.5%.

Example 14

The following are blended:

| | Parts by weight |
|---|---|
| A copolymer made in accordance with the procedure of Example 2 comprising 55% styrene, 35% of the polyester resin of Example 1 and 10% methyacrylic acid in a 3:1 xylene: butanol solution (55% solids content) | 29.1 |
| The copoylmer solution of Example 6 | 33.8 |
| Titanium dioxide | 19.0 |
| Xylene | 15.3 |

Black iron panels are coated and baked in accordance with the procedure of Example 12. The resulting films have properties equivalent to those of Example 12.

Example 15

The following are blended:

| | Parts by weight |
|---|---|
| A copolymer made in accordance with the procedure of Example 2 comprising 55% styrene, 35% of the polyester resin of Example 1 and 10% methacrylic acid in a 3:1 xylene:butanol solution (59% solids content) | 27.1 |
| The copolymer of Example 6 | 33.8 |
| Titanium dioxide | 19.0 |
| Xylene | 17.3 |

Black iron panels are coated and baked in accordance with the procedure of Example 12. The resulting films have properties equivalent to those of Example 12.

Example 16

80 parts of the copolymer of Example 3 are blended with 20 parts of the copolymer of Example 2, the blend being in xylene, about 50% solids content by weight. The solution is applied to tinplate and baked at 400° F. for about 12 minutes. The resulting film displays no discoloration and has excellent hardness, flexibility, mar resistance and adhesion. In addition, the cured film shows excellent steam processing resistance, that is, it withstands contact with steam at 121° C. for 60 minutes without showing any appreciable discontinuity or film blush. The film displays good fabrication resistance; it withstands exposure to an aqueous solution of KOH at 71° C. for 30 minutes without discontinuity or film blush. Further can ends may be readily fabricated from the coated tinplate.

Example 17

70 parts of the copolymer of Example 5 are blended with 30 parts of the copolymer of Example 3, the blend being in xylene, about 50% solids content. The solution is coated and baked on tinplate in accordance with the procedure of Example 16. The resulting film has the same desirable properties described in Example 16.

Example 18

The following ingredients are blended:

| | Parts by weight |
|---|---|
| The copoylmer solution of Example 6 | 33.8 |
| Titanium dioxide | 19.0 |
| Xylene | 10.0 |
| 46.5% solution in toluene: xylene 3:1 of the reaction product of refluxing 187.5 parts of styrene; 30 parts of ethyl acrylate, 7.5 parts of methacrylic acid, 25 parts of propylene glycol monoacrylate in the presence of 6.25 g. of an organic peroxide catalyst such as tertiary butyl perbenzoate | 34.4 |

Tinplate panels are coated and baked in accordance with the procedure of Example 16. The resulting films have properties equivalent to those of the films of Example 16.

The following blends are prepared as 50% solutions in xylene:

| | Copolymer of Ex.— | Parts | Copolymer of Ex.— | Parts |
|---|---|---|---|---|
| Example 19 | 7 | 75 | 9 | 25 |
| Example 20 | 7 | 50 | 10 | 50 |
| Example 21 | 8 | 50 | 9 | 50 |
| Example 22 | 8 | 50 | 11 | 50 |

Tinplate panels are coated and baked with these blends in accordance with the procedure of Example 16. The resulting films have properties equivalent to those of the films of Example 16.

Example 23

The following ingredients are blended:

| | Parts by weight |
|---|---|
| A copolymer made by the polymerization of 47.5 parts of styrene, 37.5 ethyl acrylate and 15 parts of methacrylic acid by refluxing in the presence of a peroxide catalyst such as cumene peroxide in high flash naphtha (50% solution) | 32.0 |
| The copolymer solution of Example 6 | 33.8 |
| Titanium dioxide | 19.0 |
| Xylene | 12.4 |

Black iron panels are coated with this blend and then baked for 15 minutes at 325° F. The resulting white films display no discoloration, excellent hardness, flexibility, mar resistance and adhesion.

Example 24

The following ingredients are blended:

| | Parts |
|---|---|
| A copolymer made by the polymerization of 60 parts of styrene, 32 parts of butyl acrylate and 8 parts of methacrylic acid by refluxing in the presence of a peroxide catalyst such as cumene peroxide in high flash naphtha (50% solution) | 10 |
| A copolymer made in accordance with the procedure of Example 4 comprising 56% styrene, 36% ethyl hexyl acrylate and 8% methylolated acrylamide | 40 |
| Xylene | 50 |

Black iron panels are coated with this blend and then baked for 15 minutes at 325° F. The resulting films display no discoloration, good hardness, flexibility, mar resistance and adhesion.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A thermosetting composition comprising (A) a copolymer of a methylolated acrylamide with at least one other ethylenically unsaturated monomer and (B) an interpolymer comprising the addition polymerization product of a monomeric mixture comprising at least 40% styrene and from 4 to 15% of an ethylenically unsaturated carboxylic acid.

2. The composition of claim 1 in which copolymer (B) is an interpolymer comprising the addition polymerization product of a monomeric mixture of at least 40% styrene, from 5 to 37.5% of an acrylic ester having the formula

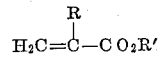

in which R is a member of the group consisting of hydrogen, methyl and ethyl, and R' is an alkyl radical containing from 1 to 8 carbon atoms and from 4 to 15% of an acrylic acid.

3. The composition of claim 1 wherein said methylolated acrylamide copolymer comprises more than 50% by weight of styrene, methylolated acrylamide and an acrylic ester having the formula $$H_2C=\overset{R}{\underset{|}{C}}-CO_2R'$$

wherein R is a member of the group consisting of hydrogen, methyl and ethyl and R' is an alkyl radical containing from 1 to 8 carbons.

4. The composition of claim 1 wherein said methylolated acrylamide copolymer comprises the addition polymerization product of acrylamide and a polyester resin comprising the condensation product of a glycol ether, an alpha-beta unsaturated dicarboxylic acid and a saturated dicarboxylic acid.

5. The composition of claim 1, further including a resin made by reacting (a) the epoxide groups of a resinous epoxide having an epoxide equivalent between 225 and 1025 and made by reacting 2,2-bis(hydroxyphenyl) propane with epichlorohydrin with (b) an equivalent amount of an acrylic acid.

6. A thermosetting composition comprising a copolymer of a methylolated acrylamide with at least one other ethylenically unsaturated monomer and a copolymer comprising the addition polymerization product of a mixture of (a) from 10 to 40% of a polyester resin comprising the condensation product of a glycol ether, and alpha-beta unsaturated dicarboxylic acid and a saturated dicarboxylic acid, (b) at least 40% styrene, and (c) from 4 to 15% methacrylic acid.

7. A copolymer according to claim 6 wherein said polyester resin comprises triethylene glycol, maleic anhydride, adipic acid and a saturated fatty acid having a chain length of from 9 to 18 carbons.

8. The composition of claim 6 wherein said methylolated acrylamide copolymer comprises the addition polymerization product of acrylamide and a polyester resin comprising the condensation product of a glycol ether, an alpha-beta unsaturated dicarboxylic acid and a saturated dicarboxylic acid.

9. The composition of claim 6, further including a resin made by reacting (a) the epoxide groups of a resinous epoxide having an epoxide equivalent between 225 and 1025 and made by reacting 2,2-bis-(hydroxyphenyl) propane with epichlorohydrin with (b) an equivalent amount of an acrylic acid.

10. A thermosetting composition comprising (A) a copolymer of methylolated acrylamide with at least one other ethylenically unsaturated monomer and (B) a hydroxyl-containing copolymer made by copolymerizing a mixture of (a) from 5 to 30% of a hydroxyl-containing monoester of an acid selected from the group consisting of acrylic acid and methacrylic acid, (b) from 5 to 37.5% of a lower acrylic ester having the formula $$H_2C=\overset{R}{\underset{|}{C}}-CO_2R'$$

wherein R is a member of the group consisting of hydrogen, methyl and ethyl and R' is an alkyl radical containing from 1 to 8 carbons, (c) at least 40% of a member selected from the group consisting of vinyl toluene, monomethyl styrene and styrene, and (d) from 4 to 15% of an ethylenically unsaturated carboxylic acid.

11. The composition of claim 10 wherein said ethylenically unsaturated carboxylic acid is methacrylic acid.

12. The composition of claim 10 wherein said hydroxyl-containing monoester is propylene glycol-monoacrylate.

13. The composition of claim 10 wherein said hydroxyl-containing monoester is hydroxyethyl methacrylate.

14. The composition of claim 10 wherein said hydroxyl-containing monoester is glyceryl monoacrylate.

References Cited by the Examiner
UNITED STATES PATENTS

| | | | |
|---|---|---|---|
| 2,870,116 | 1/1959 | Vogel et al. | 260—72 |
| 2,940,944 | 6/1960 | Christenson | 260—72 |
| 2,940,945 | 6/1960 | Christenson | 260—22 |
| 2,978,437 | 4/1961 | Christenson | 260—72 |
| 3,052,659 | 9/1962 | Woodruff | 260—80.5 |

LEON J. BERCOVITZ, *Primary Examiner.*

RONALD W. GRIFFIN, FRED E. McKELVEY,
*Assistant Examiners.*